United States Patent [19]

Bourassa et al.

[11] 3,919,736
[45] Nov. 18, 1975

[54] WINDSHIELD WIPER BLADE UNIT
[75] Inventors: Joseph R. Bourassa, Huntington; Manuel Lopez, Trumbull, both of Conn.
[73] Assignee: Parker Hannifin Corporation, Shelton, Conn.
[22] Filed: Sept. 13, 1974
[21] Appl. No.: 505,735

[52] U.S. Cl. ............................................. 15/250.42
[51] Int. Cl.² ............................................. B60S 1/02
[58] Field of Search ....................... 15/250.36–250.42

[56] References Cited
UNITED STATES PATENTS

| | | | |
|---|---|---|---|
| 3,099,031 | 7/1963 | Ludwig | 15/250.42 |
| 3,121,903 | 2/1964 | Ludwig | 15/250.42 |
| 3,427,637 | 2/1969 | Quinlan et al. | 15/250.42 |
| 3,619,556 | 11/1971 | Deibel et al. | 15/250.42 |
| 3,667,083 | 6/1972 | Linker | 15/250.42 |
| 3,751,754 | 8/1973 | Quinlan et al. | 15/250.42 |
| 3,820,188 | 6/1974 | Moorhead et al. | 15/250.42 |

Primary Examiner—Peter Feldman
Attorney, Agent, or Firm—Albert C. Johnston

[57] ABSTRACT

A windshield wiper blade unit serviceable on any of various wiper blade holders comprises a rubber blade having head and neck portions slid into a slotted central hollow of an extruded plastic backing strip having laterally open channels to receive the ends of blade holder claws, and the blade is held in place by especially formed closure elements mating with and affixed to the ends of the strip, one of these elements presenting an outwardly open arcuate channel for guiding the unit onto the ends of the holder claws and the other constituting a resilient clip for fastening the unit to an end set of the claws.

16 Claims, 8 Drawing Figures

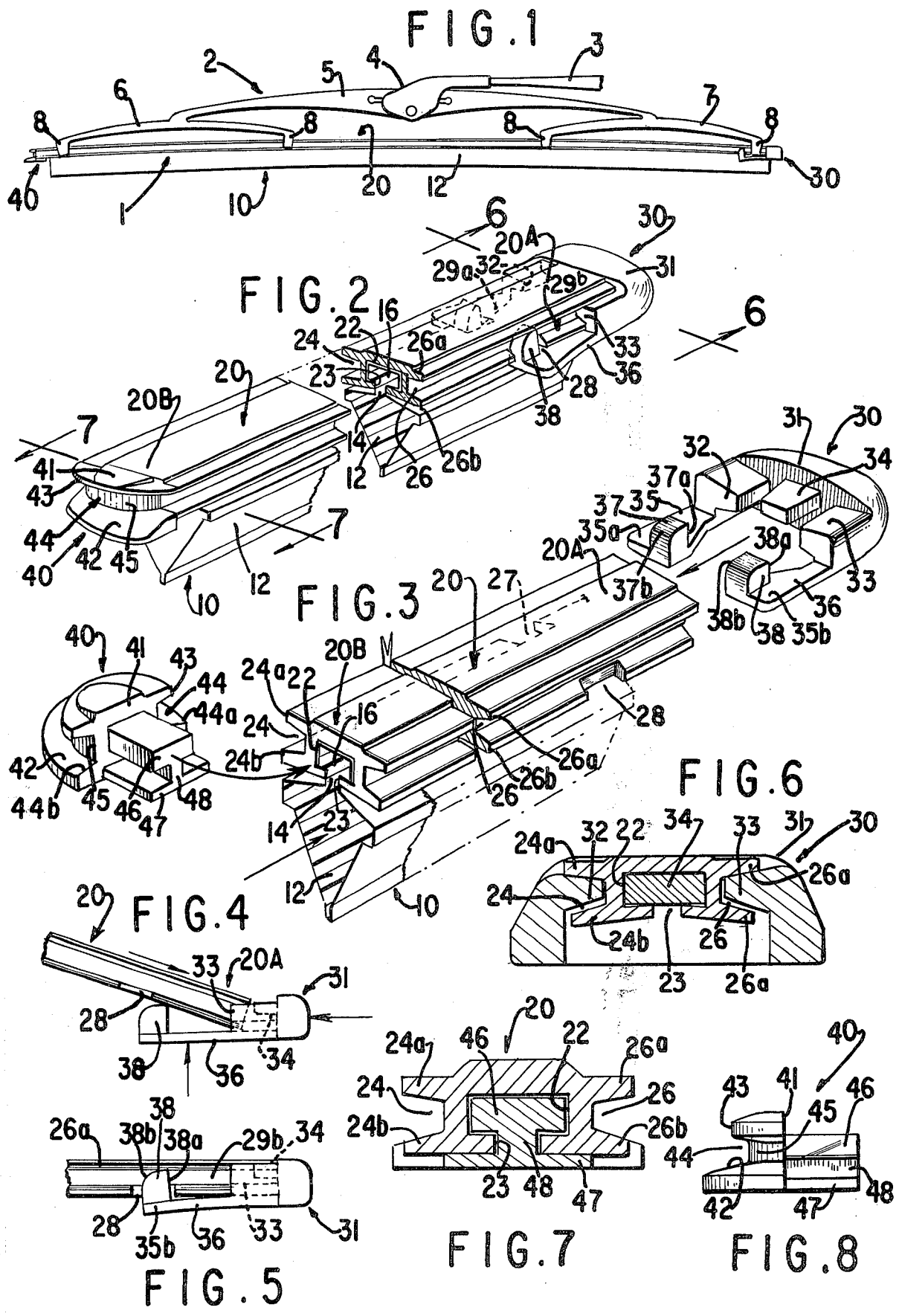

WINDSHIELD WIPER BLADE UNIT

This invention relates to windshield wipers and, more particularly, to an improved wiper blade unit, or blade refill, and components of its blade backing member.

Since the advent of curved automobile windshields, windshield wipers have been made generally in accordance with teachings of the Anderson U.S. Pat. No. 2,596,063. A replaceable blade unit is held slidably in a pressure-applying blade holder, often called a superstructure, which comprises bowed yoke portions having claws at their ends. The blade unit includes an elastic wiping blade, usually made of rubber, supported by a backing strip or pair of strips that is flexible transversely in the direction perpendicular to the windshield surface under pressure applied through the blade holder from a wiper arm. The outer edges of the backing strip are engaged by the claws of the blade holder, and a fastening device on the strip engages with a portion of the holder to keep the blade unit from sliding out of the claws in use.

In recent years wiper blade refills have been provided which are "universal" in that they serve for replacement of the blade units of any of the various forms of windshield wipers furnished on automobiles manufactured in the United States. Such refills are disclosed, for example, in U.S. Pat. Nos. 3,626,544, 3,707,741 and 3,769,653. Also, refills have been provided, for example as described in U.S. Pat. No. 3,408,680, which make use of blade backing members formed by extruding resilient plastic material and deforming end portions of suitable lengths of the extrusions.

The known refills have required troublesome operations for the manufacture or assembly of their components, and they leave needs for improvement of the ease or the security of inserting and fastening them in place in the claws of the various blade holders on which they are to be used.

The principal object of the present invention is to provide a wiper blade unit, or blade refill, and components thereof by which those needs are alleviated, and which can be produced more efficiently than the known refill structures.

The wiper blade unit herein set forth is similar to some of the known refills in that it makes use of a transversely flexible backing strip constituted by an extruded length of a resilient plastic material formed with a longitudinal hollow having a slot along its bottom for slidably receiving head and neck portions of an elastic wiper blade, and with laterally open channels along the opposite sides of the strip for slidably receiving the ends of the claws of a pressure-applying blade holder, and a resilient fastening clip is secured to one end of the strip for holding the unit assembled detachably on the holder claws.

In the present blade unit, unlike the known refills, the extrusion employed for the back strip is kept symmetrically uniform from end to end thereof, excepting that the bottom wall of each side channel is formed with a simple opening spaced away from but near one of its ends, so that the hollow, the slot and the side channels of the strip extend completely to each of its ends; and the elastic blade is held in place in the backing strip, and the blade unit completed, by an especially mating resilient fastening clip affixed to said one end of the strip and an especially mating closure element affixed to its other end.

The fastening clip is formed integrally with structures enabling it to serve multiple functions. It is self-guiding onto and self-latching on the one strip end, where it constitutes an end closure of the strip for retaining the elastic blade in place. It serves, further, for securing the blade unit on a wiper by easy yet readily detachably latching engagement with an end set of the claws of any wiper blade holder having claws engageable slidably in the side channels of the backing strip.

The closure element for the other end of the strip is formed integrally with structures by which it is self-guiding to a position across that end where it is easily fixed in place so as to hold the elastic blade in place in the strip, and it presents an outwardly open arcuate channel the ends of which mate with ends of the strip channels to provide a sloped trackway for guiding the blade unit easily onto the ends of the blade holder claws.

The fastening clip and the closure element are each made advantageously as a unitary molding of a stiff resilient plastic material. The material preferably is a thermoplastic resin and preferably is substantially the same in composition as that used for the backing strip extrusion. It is advantageous to use, for example, a polycarbonate resin impregnated with carbon black, as this material gives the blade unit desired physical properties along with reduced light reflectance or glare qualities.

The closure element is integrated with its end of the backing strip simply by fusing together some of their meeting surfaces, such as by applying to them a suitable solvent for the resin, for example, methylene chloride, or by subjecting them to ultrasonic vibration. The fastening clip may also be fixed irremovably to its end of the backing strip in like manner, for greater assurance that the blade unit will always be a securely integrated unit having its parts inseparable under any and all conditions of handling or use.

The above mentioned and other objects, features and advantages of the invention will be further evident from the accompanying drawings and the following detailed description of a preferred embodiment of the invention. In the drawings:

FIG. 1 is a side elevational view of the blade unit assembled for use in the claws of a wiper blade holder;

FIG. 2 is a perspective view of the backing strip with its end closures in place;

FIG. 3 is an enlarged exploded perspective view, partly in section, of the components of the backing strip;

FIG. 4 is a side view of an end of the backing strip proper being assembled with the fastening clip;

FIG. 5 is a side view of the clip fully assembled with the strip end;

FIG. 6 is a transverse sectional view taken at line 6—6 of FIG. 2;

FIG. 7 is a transverse section view taken at line 7—7 of FIG. 2; and

FIG. 8 is a side elevational view of an end closure element.

The windshield wiper assembly shown in FIG. 1 comprises a replaceable blade unit 1 according to the present invention, fitted onto a pressure-applying blade holder 2 which may be of any of the known commercial types but as shown is of the type disclosed in our copending application Ser. No. 402,402 filed Oct. 1, 1973.

The blade holder shown is connected for use on the end of a windshield wiper arm 3 through a coupler 4 pivoted to a central portion of its primary yoke, or bow member 5. The ends of the primary yoke are connected pivotably with mid-portions of secondary yokes, or bow members, 6 and 7. The secondary yokes carry claws 8 at their ends for sliding engagement with the backing strip of the blade unit.

The blade unit 1 is composed of four component parts, namely: an elastic rubber blade 10, a transversely flexible backing strip 20, a fastening clip 30 closing one end of strip 20, and a closure element 40 fixed on the other end of strip 20. The strip, clip and closure element normally are united inseparably when completely assembled, with the blade 10 securely supported yet held pivotably and slidably in the strip 20 between its ends.

The blade 10 consists of a length of an elastic rubber extrusion having a substantially V-shaped wiping portion 12 for engagement with a windshield, which portion is connected through a narrow neck portion 14 with a bulbous head portion 16.

The backing strip 20 consists of a length, somewhat longer than blade 10, of an extrusion of a stiff resilient material, preferably of a thermoplastic resin such as a black polycarbonate resin impregnated with carbon black. It is formed with a hollow 22 extending longitudinally from end to end thereof at its center, with a slot 23 along the bottom of the hollow, and with laterally open channels 24 and 26 along its opposite sides. The hollow 22 and slot 23 receive slidably through either end of the strip the head and neck portions 14 and 16, respectively, of the elastic blade 10. The channels 24 and 26 are formed to receive slidably the ends of the claws of the blade holder.

Channel 24 is defined between upper and lower lateral walls, or flanges, 24a and 24b of the strip extrusion, and channel 26 is defined similarly between upper and lower lateral walls 26a and 26b thereof. The extrusion is simply cut off to the length required for the backing strip of the blade unit, and then the respective bottom walls 24b and 26b of the channels are cut out, or notched, at a limited distance away from one of the strip ends, as in the end portion 20A shown in FIGS. 3 and 4, to form openings 27 and 28 which lead upwardly into the respective channels.

The fastening clip 30 is also a unitary piece of a stiff resilient material, preferably being a molding of a thermoplastic resin such as a polycarbonate resin impregnated with carbon black. It is formed with a base portion 31 to lie across an end of strip 20 and with finger portions 32 and 33 which protrude forwardly from the opposite sides of base portion 31 so as to fit into end portions of the strip channels 24 and 26. A tongue 34 also protrudes from base portion 31 at a central location between the finger portions, to fit into an end of the hollow 22 in the strip. Further, resilient legs 35 and 36 extend forwardly from base portion 31 at locations spaced below the finger portions, and these legs have on their ends upstanding lugs 37 and 38, respectively.

The lugs 37 and 38 are spaced ahead of the finger portions 32 and 33 and are formed to extend upwardly into the strip channels through the openings 27 and 28 so as to hold the clip 30 securely on the notched end portion of the backing strip and also, when the blade unit is in use, to hold an end set of the claws of the blade holder latched detachably to the blade unit.

The lugs 37 and 38, as seen in FIGS. 3 and 4, are formed with a height, relative to a central plane of the finger portions 32 and 33, substantially greater than the height of the finger portions, so that they normally will extend and be held resiliently across the strip channels in butting relation to the channel top walls 24a and 26a (see FIGS. 2 and 5) when clip 30 is in place on the strip end. The lugs present upright backward surfaces 37a and 38a, respectively, to butt against backward margins of the openings 27 and 28 and to retain a set of claws in spaces of the strip channel defined between these surfaces and the finger portions of the clip. The lugs also present across the channels forward surfaces 37b and 38b which are sloped backwardly in the upward direction for coaction with an end set of the blade holder claws so as to admit these claws easily into said channel spaces.

The clip legs also present ledges, or wing portions, 35a and 35b, respectively, which protrude laterally from the locations of the lugs 37 and 38 so as to be depressible by a person's fingers for depression of the leg ends and thus of the lugs thereon, against the resiliency of the legs, when the clip is in place on the end of the backing strip.

The structures of the clip 30 enable it to be fitted onto and self-latching upon end portion 20A of the backing strip by simply holding the clip tilted relative to the strip end as indicated in FIG. 4, engaging ends of the finger portion 32, 33 into the ends of the strip channels 24, 26 and then pushing the clip completely in place on the strip end. As the clip so engaged is pushed into place its finger and tongue portions are guided forward into place by the channels of the strip, and the ends of its leg lugs 37 and 38 slide along the channel bottom walls 24b and 26b, being depressed by them against the resiliency of the clip legs and that of the strip end, until the lugs reach the bottom wall openings 27 and 28. Then the lugs spring upwardly through those openings to their working position in the strip channels where, as indicated in FIG. 5, their ends bear against the channel top walls 24a and 26a under the resiliency of the legs 35, 36.

In that assembled condition, the clip holds itself securely on the strip end and closes off the hollow and slot of the strip so that the elastic blade slid into them cannot move beyond the clip. The clip can then be removed from the strip, if at all, only by forcibly depressing the ends of the legs 35 and 36 so far that their lugs are displaced out of the openings 27, 28. Even the possibility of removing the clip in this manner can be, and preferably is, obviated by simple fusion of some of the surfaces of the clip to meeting surfaces of the strip. Such fusion can be effected, for instance, by applying a very small quantity of a solvent for polycarbonate resin, such as methylene chloride, to some of the surfaces of clip portions 31–34 just before the clip is pushed into place on the strip end; or ultrasonic vibrations, e.g. at a frequency of about 20,000 cycles per second, may be used to effect such fusion after the clip is in place.

The clip 30 in place on the backing strip defines between its leg lugs and its finger portions spaces 29a and 29b within the strip channels for receiving and detachably latching an end set of the blade holder claws 8 slid into the channels. As the blade unit is slid along the claws, or vice versa, the ends of the claws of the first set engage against the sloped forward surfaces 37b, 38b of the lugs and, with little force needed, will depress the lugs by a camming action so as to pass over them into the channel spaces 29a, 29b. The first set of claws then is latched securely to the backing strip of the blade unit for all conditions of handling and use of the wiper. When the blade unit is to be replaced, however, it can readily be released for sliding off the claws; pressure applied by a person's fingers to the ledges 35a, 35b of the clip legs will depress the lugs sufficiently to free the latched claws.

The closure element 40 is also a unitary piece of a stiff resilient material, preferably being a molding of a thermoplastic resin such as a polycarbonate resin impregnated with carbon black. It is formed with a body portion 41 adapted to lie across the end of portion 20B of the backing strip (FIGS. 2 and 3) opposite to the end occupied by clip 30, and with backward protrusions to fit into hollow 22 and slot 23 at that strip end.

The body portion 41 is formed with a depth slightly greater than the overall depth, or thickness, of strip 20. It presents a forwardly and laterally protruding base wall 42 and a top wall 43 which is spaced above the base wall and protrudes similarly, though to a lesser extent, so that an outwardly open arcuate channel 44 is defined between these walls and an upright, longitudinally convex surface 45 of the body portion. The ends 44a and 44b of this arcuate channel mate with the ends of the backing strip channels 24 and 26, respectively, so that the closure element will provide a curved trackway for guiding the blade unit easily onto the ends of the claws of a wiper blade holder. The greater forward protrusion of the base wall 42 and the slope of its upper surface (see FIG. 8) facilitate the claw engaging and guiding functions of the closure element.

The backward protrusions of the closure element 40 include a central tongue portion 46 formed to fit into an end of the backing strip hollow 22, a bottom flange 47 spaced below the tongue portion so as to underlie bottom portions of the strip end, and an intervening upright central web portion 48 formed to fit into an end of the strip slot 23.

The closure element is fitted in place simply by pushing it onto the strip end so that the tongue and web portions 46 and 48 are inserted into the hollow and slot of the strip with flange 47 lying beneath the slot. It can be fixed in place as an inseparable part of the blade unit by simple fusion of some of its surfaces to meeting surfaces of the strip end. The fusion can be effected, for instance, by applying a minute quantity of a solvent for polycarbonate resin, such as methylene chloride, to some of the backward surfaces of the closure element just before they are fitted in place.

In assembling the blade unit, the elastic blade 10 can be slid into place in the backing strip 20 through either end of the strip, and either before or after the clip 30 or the closure element 40, as the case may be, has been fitted in place on the other end of the strip. Ordinarily, it is preferred to fit and fuse the clip onto its end of the strip, then to slide the blade into the strip, and then to fit and fuse the closure element in place.

We claim:

1. In a windshield wiper blade unit including a transversely flexible backing strip constituted by a length of an extrusion of a resilient plastic material, said strip being longitudinally hollow and slotted along the bottom thereof for receiving slidably in the hollow and the slot thereof a head portion and a neck portion, respectively, of an elastic wiper blade and having along the opposite sides thereof laterally open channels for slidably receiving the ends of the claws of a pressure-applying wiper blade holder, and a resilient clip secured to one end of said strip for holding said unit assembled detachably on said claws, the improvement wherein said hollow, said slot and said channels extend completely to said strip end and said clip is a unitary molding of a stiff resilient plastic material comprising a base portion lying across said strip end, finger portions protruding from said base portion at the opposite sides thereof and fitted into end portions of said channels, and at least one resilient leg each spaced below one of said finger portions and extending forwardly from said base portion below the bottom wall of one of said channels and having on its end an upstanding lug spaced ahead of said finger portion, said bottom wall having an opening therein spaced away from said strip end, said lug extending upwardly through said opening into said channel for securing said clip on said strip end and to hold a claw of said holder in the channel space between said lug and said finger portion, said lug being depressible from said channel against the resiliency of said clip to admit said claw into or to release it from said space.

2. A wiper blade unit according to claim 1, said clip further comprising a tongue protruding from said base portion at a location between said finger portions and fitted into an end of said hollow to hold said clip centered on said strip and to prevent movement of said blade from said strip end.

3. A wiper blade unit according to claim 1, said hollow, said slot and said channel extending completely also to the other end of said strip and said other end having a closure element fixed to and across the same to prevent movement of said blade from said other end, said closure element comprising a body portion defining an outwardly open arcuate channel the ends of which mate with ends of the aforesaid channels to provide a trackway for guiding the blade unit onto said claw ends.

4. A wiper blade unit according to claim 3, said closure element having on said body portion a tongue portion and a bottom flange spaced apart and interconnected by an upright central web portion, said tongue portion and said web portion fitting into ends of said hollow and said slot, respectively, and said flange underlying bottom portions of said strip, at said other strip end.

5. A wiper blade unit according to claim 3, said plastic material being a polycarbonate resin and said clip and said closure element each being a unitary molding of a polycarbonate resin, said strip with said blade received therein having surfaces thereof at said ends thereof fused to meeting surfaces of said clip and said closure element, respectively.

6. In a windshield wiper blade unit including a transversely flexible backing strip constituted by a length of an extrusion of a resilient plastic material, having a hollow formed centrally therein and therealong with a slot along the bottom of said hollow, for receiving slidably in said hollow and said slot a head portion and a neck portion, respectively, of an elastic wiper blade, and having laterally open channels along the opposite sides thereof for slidably receiving the ends of the claws of a pressure-applying wiper blade holder, and a resilient clip secured to one end of said strip for holding said unit assembled detachably on said claws, the improvement wherein said hollow, said slot and said channels extend completely from end to end of said strip, and said clip comprises a base portion lying across said strip end, finger portions protruding from said base portion at the opposite sides thereof and fitted into ends of said channels, a tongue protruding from said base portion at a location between said finger portions and fitted into an end of said hollow, and resilient legs respectively spaced below said finger portions and extending forwardly from said base portion below the bottom walls of said channels and having on their respective ends upstanding lugs spaced ahead of said finger portions, said bottom walls each having an opening therein spaced away from said strip end, said lugs extending upwardly through said openings into said channels and presenting (1) forward surfaces sloped backwardly in the upward direction so as to lie across the path of and be depressed by sliding movement of an end set of said claws toward the spaces in said channels between said lugs and said finger portions and (2) upright backward surfaces to butt against margins of said openings for holding said clip on said strip end and to hold an end set of said claws in said spaces, said legs presenting ledges protruding laterally from the locations of said lugs for depression by a person's fingers so as to depress said lugs from said channels against the resiliency of said clip and thereby release said end set of claws from said spaces, and a closure element fixed to and across the other end of said strip to prevent movement of said blade from said other end, said closure element comprising a body portion defining an outwardly open arcuate channel the ends of which mate with ends of the aforesaid channels to provide a trackway for guiding the blade unit onto said claw ends, said closure element having on said body portion a tongue portion and a bottom flange spaced apart and interconnected by an upright central web portion, said tongue portion and said web portion fitting into ends of said hollow and said slot, respectively, and said flange underlying bottom portions of said strip, at said other strip end.

7. A wiper blade unit according to claim 6, said strip, said clip and said closure element each being composed of a black polycarbonate resin, said clip and said closure element each having surfaces thereof fused to meeting surfaces of said strip at an end of said strip.

8. A closure element to be fixed to and across an end of a windshield wiper blade backing strip having at said end a central longitudinal hollow formed with a slot along the bottom thereof, for slidably receiving head and neck portions of an elastic wiper blade, and having laterally open side channels at the opposite sides of the strip for slidably receiving the ends of the claws of a pressure-applying wiper blade holder, said element comprising a body portion having thereon integral protrusions to fit into the ends of said hollow and said slot, said body portion defining an outwardly open arcuate channel the ends of which mate with ends of said strip channels to provide a trackway for guiding said strip onto said claw ends.

9. A closure element according to claim 8, said protrusions including a tongue portion and a bottom flange spaced apart and interconnected by an upright central web portion, said tongue portion and said web portion fitting into said hollow and said slot, respectively, and said flange underlying bottom portions of said strip, at said strip end.

10. A resilient clip to hold a windshield wiper blade unit assembled detachably on the claws of a pressure-applying wiper blade holder, comprising a unitary piece of a stiff resilient material formed with a base portion to lie across an end of a backing strip of said unit, finger portions respectively protruding from said base portion at its opposite sides so as to fit into end portions of laterally open channels formed along the opposite side of said backing strip for slidably receiving ends of said claws, and at least one resilient leg each spaced below one of said finger portions and extending forwardly from said base portion and having on its end an upstanding lug spaced ahead of said finger portion and formed to extend upwardly into one of said channels through an opening provided in the bottom wall of said channel for securing said clip on said strip end and to hold a claw of said holder in the channel space between said lug and said finger portion, said lug being depressible from said channel against the resiliency of said clip to admit said claw into or to release it from said space.

11. A clip according to claim 10, said piece being a molding of a black polycarbonate resin.

12. A clip according to claim 10, said lug presenting (1) a forward surface sloped backwardly in the upward direction so as to lie across the path of and be depressed by sliding movement of said claw along said channel toward said space and (2) an upright backward surface to butt against a margin of said opening for securing said clip on said strip end and to retain said claw in said channel space.

13. A clip according to claim 10, said leg presenting a ledge protruding laterally from the location of said lug for depression by a person's finger so as to depress said lug for release of said claw from said space.

14. A clip according to claim 10, the height of said lug being substantially greater than that of said finger portions so that said lug extending through said opening is pressed yieldably against the top wall of said channel by the resiliency of said clip.

15. A clip according to claim 10, further comprising a tongue protruding forwardly from said base portion at a location between said finger portions to fit into an end of a hollow extending longitudinally in said backing strip between said channels.

16. A resilient clip to hold a windshield wiper blade unit assembled detachably on the claws of a pressure-applying wiper blade holder, comprising a unitary molded piece of a black polycarbonate resin formed with a base portion to lie across an end of a backing strip of said unit, finger portions respectively protruding from said base portion at the opposite sides thereof so as to fit into end portions of laterally open channels formed along the opposite sides of said backing strip for slidably receiving ends of said claws, a tongue protruding forwardly from said base portion at a location between said finger portions to fit into an end of a hollow extending longitudinally in said backing strip between said channels, and resilient legs respectively spaced below said finger portions and extending forwardly from said base portion and having on their respective ends upstanding lugs spaced ahead of said finger portions and formed to extend upwardly into said channels through respective openings provided in the bottom walls of said channels so as to hold said clip on said strip and to hold a set of said claws in the channel spaces between said lugs and said finger portions, said lugs being depressible from said channels against the resiliency of said clip to admit the claws of said set into or to release the same from said spaces, said lugs having a height substantially greater than that of said finger portions so that when extending through said openings they are pressed yieldably against the top walls of said channels by the resiliency of said clip, said lugs presenting (1) forward surfaces sloped backwardly in the upward direction so as to lie across the path of and be depressed by sliding movement of the claws of said set along said channels toward said spaces and (2) upright backward surfaces to butt against margins of said openings for securing said clip on said strip end and to retain the claws of said set in said channel spaces, said legs presenting ledges protruding laterally from the locations of said lugs for depression by a person's fingers so as to depress said lugs for release of said claws from said spaces.

* * * * *